March 28, 1961     E. P. MOSLO     2,976,571
MOLD VENTING STRUCTURE

Filed Nov. 14, 1958     2 Sheets-Sheet 1

INVENTOR.
ERNEST P. MOSLO
BY
Hyde, Meyer, Baldwin & Dean
ATTORNEYS

March 28, 1961  E. P. MOSLO  2,976,571
MOLD VENTING STRUCTURE
Filed Nov. 14, 1958  2 Sheets-Sheet 2

INVENTOR.
ERNEST P. MOSLO
BY
Hyde, Meyer, Baldwin & Doran
ATTORNEYS

United States Patent Office 2,976,571
Patented Mar. 28, 1961

2,976,571

MOLD VENTING STRUCTURE

Ernest P. Moslo, Lakewood, Ohio (Moslo Machinery Company, 2443 Prospect Ave., Cleveland 15, Ohio)

Filed Nov. 14, 1958, Ser. No. 773,874

2 Claims. (Cl. 18—42)

This invention relates to improvements in a mold venting structure and more particularly to a mold venting structure for an injection molding machine.

One of the objects of the present invention is to provide a mold venting structure for rapidly exhausting a mold cavity of gas, for preventing escape of the injected material from the mold cavity into the venting path, for reducing the injection pressure on the injected material required to fill the mold cavity, for reducing the temperature of the injected material, for providing stronger and less porous molded pieces, for reducing the weight of the injected material per article, and/or for increasing the production rate of an injection molding apparatus.

Another object of the present invention is to provide venting means for a mold cavity comprising a passageway which is always open between the mold cavity and a zone of lower pressure, which includes an opening immediately adjacent the mold which is large enough for venting purposes but of a cross section not permitting flow of the molding material out of the cavity, which passage maintains its limited cross section only for a predetermined passage length, which is self-cleaning by the vented gases, and which passage, after said predetermined length, increases in cross section for facilitating the venting action.

Another object of the present invention is to provide a mold venting structure characterized by its inexpensive manufacturing cost, structural simplicity, strong and sturdy nature, operating efficiency, and/or ease of operation.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 5 is a top plan view of a second form of die plate members; while

Figure 1:
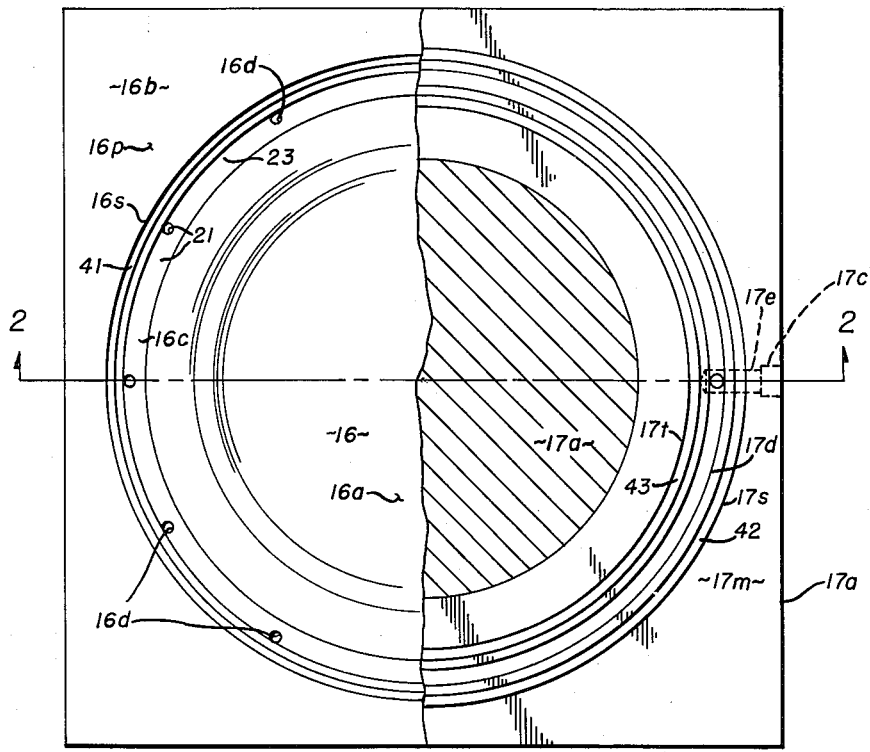
Fig. 1 is a horizontal sectional view taken along the line 1—1 through a first form of die plate members shown in Fig. 2.

Before the apparatus here illustrated is specifically described, it is to be understood that the invention here involved is not limited to the structural details or arrangement of parts here shown since an apparatus embodying the present invention may take various forms. It is also to be understood that the phraseology or terminology herein employed is for purposes of description and not of limitation since the scope of the present invention is denoted by the appended claims.

In an injection molding machine, it is desirable to remove the gases quickly from the mold cavity while preventing the injected material from escaping from the mold cavity. Removing the gases quickly prevents porousness in the molded article and prevents the compressed and heated gas in the cavity from burning the injected material, especially if the material is synthetic plastic. If the gases are removed properly, this action will reduce the weight of the molded article, increase the production rate, provide the molded article with greater strength, reduce the temperature at which the material must be injected into the mold cavity, and decrease the injection pressure required to be exerted on the material so that no flash is obtained.

Relatively movable die members disclosed in the present application may be used on any suitable injection molding machine, and are here described, for illustration only, for use on the injection molding machine disclosed in my co-pending United States patent application, Serial No. 567,364, filed February 23, 1956, and entitled "Method and Apparatus for Injection Molding of Articles," now Patent No. 2,896,258, issued July 28, 1959. This co-pending application and the present disclosure each have correspondingly numbered parts operable in basically the same manner and including a stationary frame member 14, stationary cavity plate or die member 15 secured to member 14, stationary material injection nozzle 34, movable die member 16, and movable support member 17 with members 15 and 16 having recesses 15a and 16a forming the mold cavity 18. Member 17 is shown herein as two members 17a and 17b secured together.

In the present disclosure, two different forms of die members 15, 16 and 55, 56 are provided with these respectively having opposed faces 15b, 16b and 55b, 56b including recesses 15a, 16a and 55a, 56a to form mold cavities 18 and 58, respectively. Die members 16 and 56 and support member 17, carrying either die member 16 or 56, are movable, in the same manner as shown in the copending application, from a face contiguous position, as shown in Figs. 2, 4 and 6 with these members forming closed mold cavities 18 and 58, in the direction shown by arrows M and R to a face spaced apart position (not shown) with faces 15b, 16b or 55b, 56b spaced a substantial distance apart to form an open mold cavity by opening cavity 18 or 58, and are movable in the reverse directions N and S back to the illustrated positions.

Figures 2, 3:
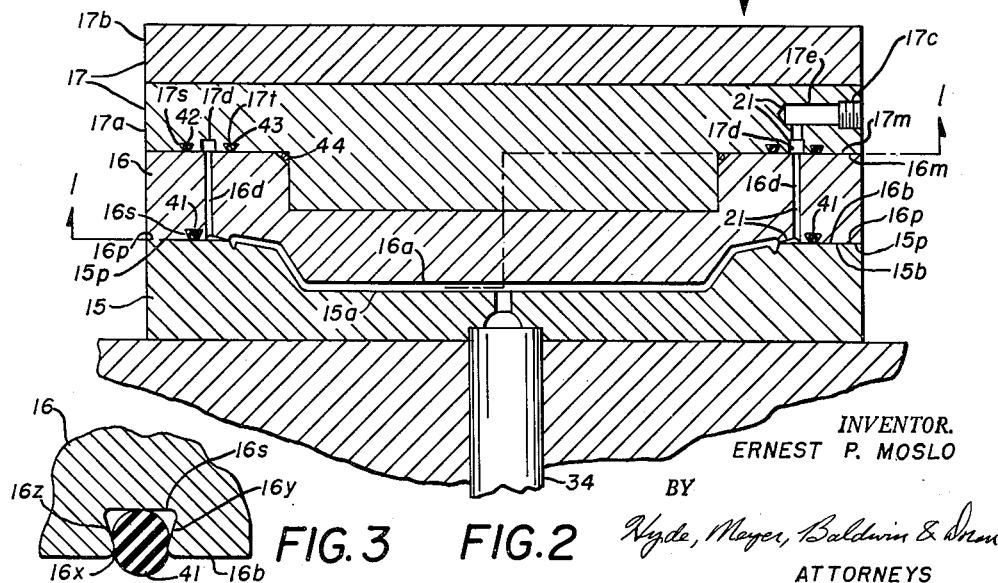
Fig. 2 is a vertical sectional view taken along the line 2—2 of Fig. 1.
Fig. 3 is an enlargement of a portion of Fig. 2.
Figure 4:
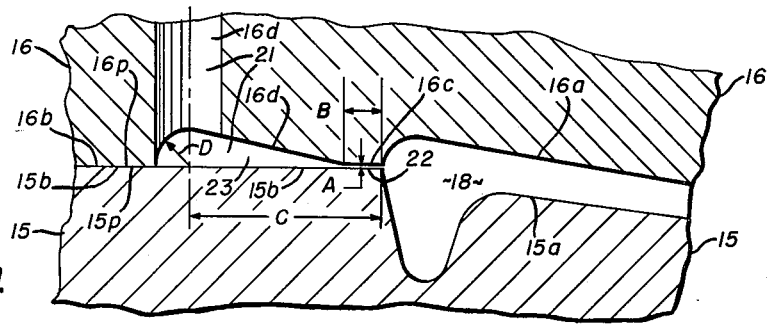
Fig. 4 is an enlargement, four times actual size, of a portion of Fig. 2.
Figure 6:
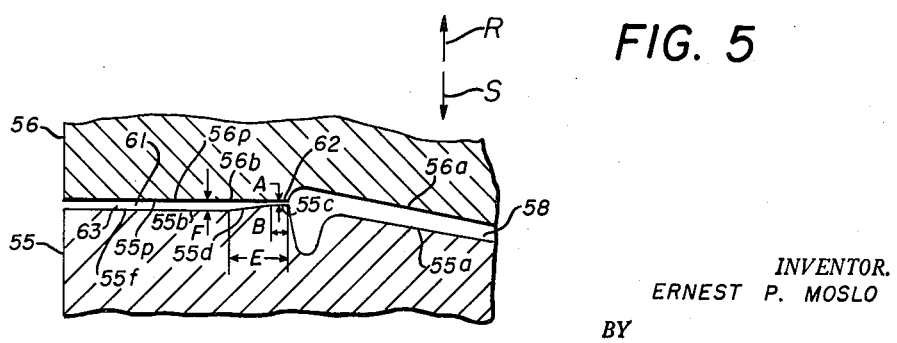
Fig. 6 is a vertical sectional view, double the size of Fig. 5, taken along the line 6—6 of Fig. 5.

Pairs of die members 15—16 or 55—56 each include a mold cavity venting means ventable to a zone of lower pressure than the interior of the cavity for exhausting gas along a path 21 or 61 from mold cavity 18 or 58 to this zone while the members 15 and 16 or 55 and 56 are in the face contiguous position illustrated in Figs. 2 and 4 or Fig. 6.

In each form of the invention, the path includes a restricted opening 22 or 62 at the cavity end of the path in Figs. 4 and 6. It has been found in practice that good results are obtained when each of these openings is constructed as shown in Figs. 4 and 6. Figs. 4 and 6 have respectively lands 16c and 55c coacting respectively with flat die faces 15b and 56b to provide this opening of uniform vertical thickness in each of these figures. Good results have been obtained when the smallest dimension extending transverse to the direction of gas flow, shown as dimension A, is 0.00075 to 0.0015 inch and the length of each land, or the longitudinal dimension extending in the direction of flow, shown as dimension B, is from 1/16 to 1/8 inch.

Paths 21 and 61 include respectively passageway portions 23 and 63 connected to the downstream side of openings 22 and 62 and gradually enlarging this transverse dimension A in the downstream direction from openings 22 and 62. These are formed in Figs. 4 and 6 by die member face 15b and tapered face portion 16d of face 16b and by flat die member face 55b and tapered face portion 55d and groove 55f of face 55b. Both passageway portions 23 and 63 are shown with substantially the same taper in Figs. 4 and 6 along tapered face portions 16d and 55d. Good results have been obtained in practice with dimension C equal to 3/8 inch, dimension D equal to 1/16 inch radius, dimension E equal to 3/16 inch, and dimension F equal to 1/32 inch. The optimum condition is to have the taper at 16d and 55d such that it is kept clean by the movement of the vented gases.

The aforesaid portion of the gas exhaust paths 21 and 61 are formed by die member face portions 15b and 16d or 55d, 55f and 56b when the members are in the face contiguous position illustrated in Figs. 2 and 6. However, these paths are opened when die members 16 and 56 are lifted to their face spaced apart position.

The aforesaid structure of these paths 21 and 61 provides many advantages. First, it exhausts the gas from the cavity rapidly enough to cause dense molding and to prevent burning of the material injected into the mold cavity. If the air is not exhausted fast enough, it may either remain in the cavity and cause porousness in the molded article or may be compressed and heated, before it has been exhausted, so as to burn the peripheral edges of the molded article. To avoid these problems, the dimension A should be above 0.00075 inch to permit rapid gas exhaust. Second, the material injected into the cavity should be prevented from flowing through the restricted opening and out along the path. An undesirable flashing on the article will be obtained if leakage occurs. This undesirable leakage is prevented if dimension A is equal to or less than 0.0015 inch and dimension B is at least approximately 1/16 inch. Third, restricted openings 22 and 62 are self-cleaning by the gas exhausting from the mold cavity so as to prevent clog up of this opening by the condensed volatiles carried by the injected material. If this opening is not self cleaning, the deposit of condensed volatiles or vapor from the injected material builds up after a few articles are molded so that proper venting of the mold cavity cannot take place. Self cleaning is assured by maintaining dimension B equal to or less than 1/8 inch.

Figure 5:
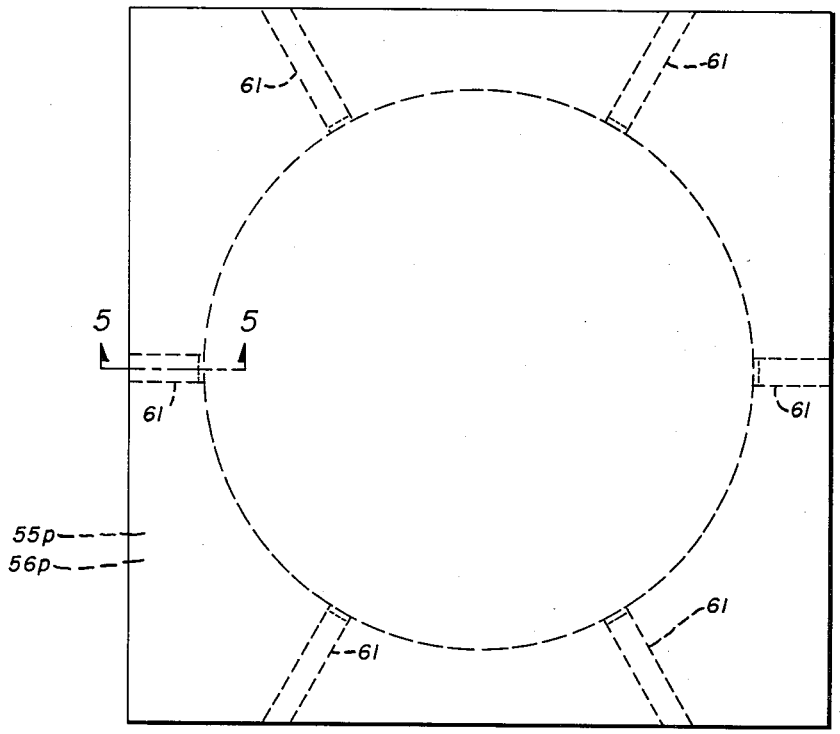

The two illustrated forms of the invention also have structural differences. In Figs. 5 and 6, a plurality of arcuately spaced apart, radially extending paths 61 are provided with these paths shown as six in number and with each exhausting the gases from the mold cavity 58 to the atmosphere as a zone of lower pressure.

The form shown in Figs. 1, 2 and 4 has its path 21 connectable by fitting 17c in Fig. 2 to a source of vacuum for exhausting the gas from the mold cavity 18. This source of vacuum serves as the zone of lower pressure with this vacuum source applied either just before the plastic flow starts into the cavity 18 or while the plastic is flowing into this cavity. In Figs. 1–4, mold cavity 18 is vented completely around its periphery by having opening 22 and passageway 23 forming an annular or circular endless passageway portion in Fig. 1 arranged generally concentrically with the cavity 18. Vertical holes 16d in member 16, arcuately spaced about a circumference, extend upwardly from annular passageway 23 to an annular recess 17d in member 17a from which the exhausted gas travels to the vacuum source through hole 17e and fitting 17c in member 17a.

Figs. 1 and 2 provide suitable sealing construction to prevent vacuum leakage between faces 15b, 16b, 16m and 17m of members 15, 16 and 17a where the gas flow path is in fluid communication with at least a portion of each of these faces. Suitable sealing means, such as O-rings 41, 42, 43 and 44 surround the passageway portions 23, 16d and 17d, when the members 15 and 16 are in the face contiguous position shown in Fig. 2 to seal the path 21 against gas leakage. O-rings 41, 42 and 43 are respectively held in place by grooves 16s, 17s and 17t in members 16 and 17a. These grooves are formed in member faces 16b and 17m for sealingly engaging respectively against faces 15b and 16m. Since O-ring 41 engages face 15b only in the face contiguous position illustrated in Fig. 2, suitable means must be provided for retaining O-ring 41 in this groove while the members 15 and 16 are moved out of the illustrated face contiguous position. This takes the form in Fig. 3 of the opposite sides 16y and 16z of groove 16s tapering in the enlarging direction inwardly (upwardly in Fig. 3) from groove mouth 16x located at face 15b with this groove mouth 16x having a width (horizontal dimention in Fig. 3) less than the diameter of the O-ring 41 in its unstressed position so that the O-ring will be wedged in groove 16s and will be carried upwardly by member 16 as it moves away from stationary member 15.

It should also be noted that the form illustrated in Figs. 1–4 will require a substantially lower clamping pressure than in the normal molding machine because the vacuum applied to mold cavity 18 will help hold members 15 and 16 in the closed position shown in Fig. 2, and will reduce the injection pressure tending to separate members 16 and 15 by reducing the pressure in cavity 18 and by pulling the material through nozzle 34 into cavity 18.

In each form of the invention, it is desirable to positively and accurately maintain the dimension A and to control the face pressure against O-ring 41 by providing a suitable stop to limit the travel of member 16 or 56 toward member 15 or 55 under the mold closing pressure. Here, stop portions 15p and 16p of faces 15b and 16b are located outwardly beyond O-ring 41 in Figs. 2 and 4 to provide this function. In Figs. 5 and 6, stop portions 55p and 56p of faces 55b and 56b, located arcuately between passageways 61, provide this function. In each form of the invention, the stop portions abut in the face contiguous position illustrated in Figs. 2 and 6 to maintain dimension A while the mold cavity closing forces are exerted on the die members to maintain these members in the face contiguous positions illustrated.

Variations from the illustrated structure should be readily apparent as coming within the scope of the present invention. First, a multiple cavity mold could be vented by this construction instead of the single cavity mold illustrated in the drawings. Second, the center line of the O-ring in Fig. 1 may be of any shape, such as rectangular, to fit the periphery of the mold cavity instead of being circular, as illustrated in Fig. 1. Third, the location of the venting opening 22 or 62 may be at any convenient location, and not just at the locations illustrated, but with this location generally remote from the point of injection so as to more readily vent the mold cavity. Fourth, water cooling may be added to any of the mold members to increase production and to more effectively seal against injected material leakage through the opening 22 or 62, but the illustrated constructions will work satisfactorily with or without water cooling.

Various changes in details and arrangement of parts can be made by one skilled in the art without departing from either the spirit of this invention or the scope of the appended claims.

What is claimed is:

1. In a mold for molding articles of plastic material of the type giving off condensible volatile material as molded, said mold having separable mold sections which are relatively recessed to provide a plastic material receiving cavity at their mutually engaging faces; means for venting said cavity comprising a passageway in said mold communicating with said cavity and leading to a vacuum source connection, said passageway having a narrow transverse dimension immediately adjacent said cavity between approximately 0.00075″ and 0.0015″ with this dimension maintained generally constant for a distance approximately 1/16″ to 1/8″ only downstream, and said passageway immediately downstream from the termination of said narrow transverse dimension increasing in said transverse dimension quickly to a size to clear a plug of condensed volatile material released from said passageway portion of narrow transverse dimension.

2. The combination of claim 1, wherein said passageway immediately downstream from the termination of said narrow transverse dimension increases quickly to a transverse dimension of approximately 1/32″.

References Cited in the file of this patent
UNITED STATES PATENTS

| | | |
|---|---|---|
| 2,243,835 | Brunner et al. | June 3, 1941 |
| 2,266,831 | Tegarty | Dec. 23, 1941 |
| 2,304,461 | Knowles | Dec. 8, 1942 |
| 2,772,012 | Crabtree | Nov. 27, 1956 |